(12) United States Patent
Hiraiwa et al.

(10) Patent No.: US 11,260,823 B2
(45) Date of Patent: Mar. 1, 2022

(54) AIRBAG FOR A PASSENGER SEAT

(71) Applicant: TOYODA GOSEI CO., LTD., Kiyosu (JP)

(72) Inventors: Takuya Hiraiwa, Kiyosu (JP); Shinichi Ishida, Kiyosu (JP); Keita Suzuki, Nagoya (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 91 days.

(21) Appl. No.: 16/552,410

(22) Filed: Aug. 27, 2019

(65) Prior Publication Data

US 2020/0079313 A1 Mar. 12, 2020

(30) Foreign Application Priority Data

Sep. 7, 2018 (JP) .............................. JP2018-167992

(51) Int. Cl.
*B60R 21/205* (2011.01)
*B60R 21/231* (2011.01)
*B60R 21/2346* (2011.01)
*B60R 21/276* (2006.01)
*B60R 21/235* (2006.01)

(52) U.S. Cl.
CPC .......... *B60R 21/231* (2013.01); *B60R 21/205* (2013.01); *B60R 21/235* (2013.01); *B60R 21/2346* (2013.01); *B60R 21/276* (2013.01)

(58) Field of Classification Search
CPC ... B60R 21/205; B60R 21/231; B60R 21/201; B60R 21/2346
See application file for complete search history.

(56) References Cited

U.S. PATENT DOCUMENTS

| 2006/0006633 A1* | 1/2006 | Bito ..................... B60R 21/2346 |
| | | 280/740 |
| 2017/0120853 A1* | 5/2017 | Rose ..................... B60R 21/201 |
| 2017/0129447 A1 | 5/2017 | Takebayashi et al. |
| 2018/0037185 A1* | 2/2018 | Minami ................ B60R 21/217 |

FOREIGN PATENT DOCUMENTS

| JP | 2013-169878 A | 9/2013 |
| JP | 2013233901 A * | 11/2013 |
| JP | 2017-087998 A | 5/2017 |

OTHER PUBLICATIONS

Definition of "straight"; https://www.thefreedictionary.com/straight; Mar. 26, 2021.*

* cited by examiner

*Primary Examiner* — Keith J Frisby
(74) *Attorney, Agent, or Firm* — Posz Law Group, PLC

(57) ABSTRACT

An airbag for a passenger seat is folded and stored in a storage so as to be deployed towards the passenger seat in such a manner as to enlarge towards the left and right when exiting the storage. The airbag includes a bag body that includes a mount-side portion to be mounted on the storage, and a cover panel that is made of a flexible sheet-shaped material and covers an outer circumference of the mount-side portion of the bag body. The cover panel is configured to cover an edge of a peripheral member of the storage at least in left and right sides of the storage at airbag deployment. The cover panel is joined to the bag body in such a manner that its edge portion is capable of slipping relative to the bag body at least in the left and right portions.

11 Claims, 10 Drawing Sheets

AIRBAG FOR A PASSENGER SEAT

CROSS REFERENCE TO RELATED APPLICATIONS

The Present application claims priority from Japanese Patent Application No. 2018-167992 of Hiraiwa et al., filed on Sep. 7, 2018, the entire disclosure of which is incorporated herein by reference.

BACKGROUND OF THE INVENTION

1. Field of the Invention

The present invention relates to an airbag for a passenger seat that is adapted to be stored in a storage provided inside an interior trim member of a vehicle which is disposed in front of a passenger seat, and that is deployable from the storage in such a manner as to enlarge towards the left and right and protrude rearward when fed with an inflation gas.

2. Description of Related Art

JP 2013-169878 A discloses a known airbag for a passenger seat whose inflatable body has a double-wall construction in the front end portion which is to be disposed in a vicinity of the storage at airbag deployment. More particularly, the bag body is reinforced in the front end portion with four separate patch cloths.

In the conventional airbag for a passenger seat, the patch cloths are applied in order to enhance rigidity of the front end portion of the bag body at airbag deployment as well as control the deployment behavior of the bag body. However, since the four patch cloths are individually joined (sewn) to the bag body so as to cover an upper portion, a lower portion, a left portion and a right portion of the bag body, the patch cloths do not easily slip or move relative to the bag body. Further, the patch cloths can hinder a smooth deployment of the airbag when, for example, one or more patch cloths is (are) brought into contact with an edge of an instrument panel or the like and get(s) stuck there at airbag deployment.

SUMMARY OF THE INVENTION

An object of the present invention is to provide an airbag for a passenger seat that is able to deploy its bag body quickly and also protect the bag body from a peripheral member of an airbag storage.

The object of the invention will be achieved by the following airbag for a passenger seat:

The airbag for a passenger seat of the invention is adapted to be folded and stored in a storage which is disposed in an interior trim member of a vehicle in front of a passenger seat. The airbag is configured to be deployed towards the passenger seat in such a manner as to enlarge towards the left and right when exiting the storage.

The airbag includes a bag body that is inflatable with an inflation gas and includes a mount-side portion which is adapted to be mounted on the storage, and a cover panel that is made of a flexible sheet-shaped material and covers an outer circumference of the mount-side portion of the bag body.

The cover panel is configured to cover an edge of the interior trim member at least in left and right sides of the storage at airbag deployment, and is joined to the bag body such that its edge portion is capable of slipping relative to the bag body at least in the left and right portions.

With the airbag for a passenger seat of the invention, at airbag deployment, by covering the edge of the interior trim member at least in the left and right sides of the storage, the cover panel adequately protects the bag body from being interfered with the edge of the interior trim member in the left and right sides of the storage in the course of airbag deployment. Moreover, since the cover panel is configured to be capable of slipping relative to the bag body in the edge, even if the cover panel is brought into contact with the edge of the interior trim member disposed around the storage and gets stuck there at airbag deployment, the bag body is able to slip out from the cover panel and be deployed quickly with no influence of the jammed cover panel.

Therefore, the airbag for a passenger seat of the invention is able to protect the bag body from a peripheral member of the storage and deploy the bag body quickly at deployment.

In the airbag for a passenger seat of the invention, it is desired that the cover panel is disposed over an entire outer circumference of a front end portion of the bag body as inflated including the mount-side portion, and that the cover panel is joined to the bag body by a central portion in a left and right direction of the upper surface as deployed. This configuration will prevent the cover panel from slipping considerably relative to the bag body during a folding work of the airbag, thus facilitate the folding work.

DETAILED DESCRIPTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
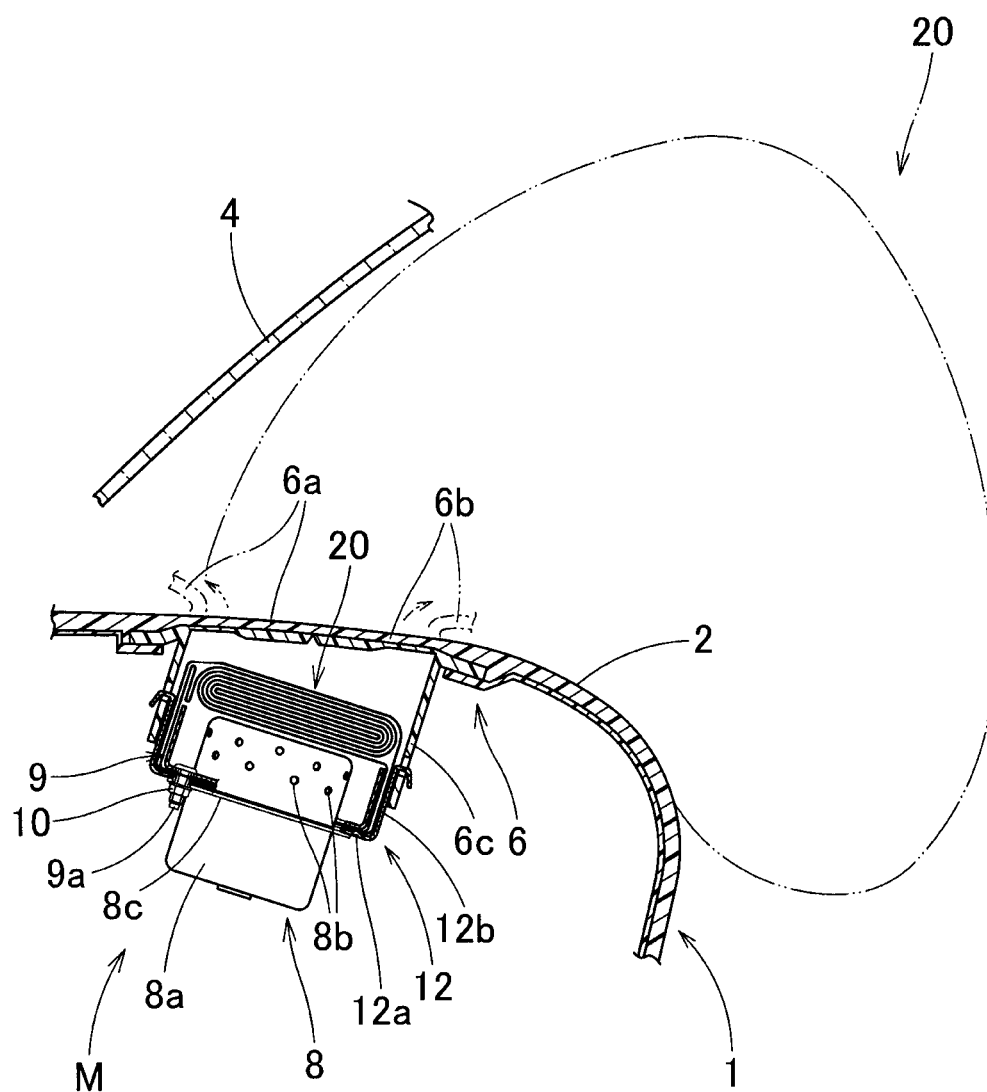
FIG. 1 is a schematic vertical sectional view of an airbag device for a passenger seat as mounted on a vehicle, the airbag device employing an airbag embodying the invention.
Figure 7:
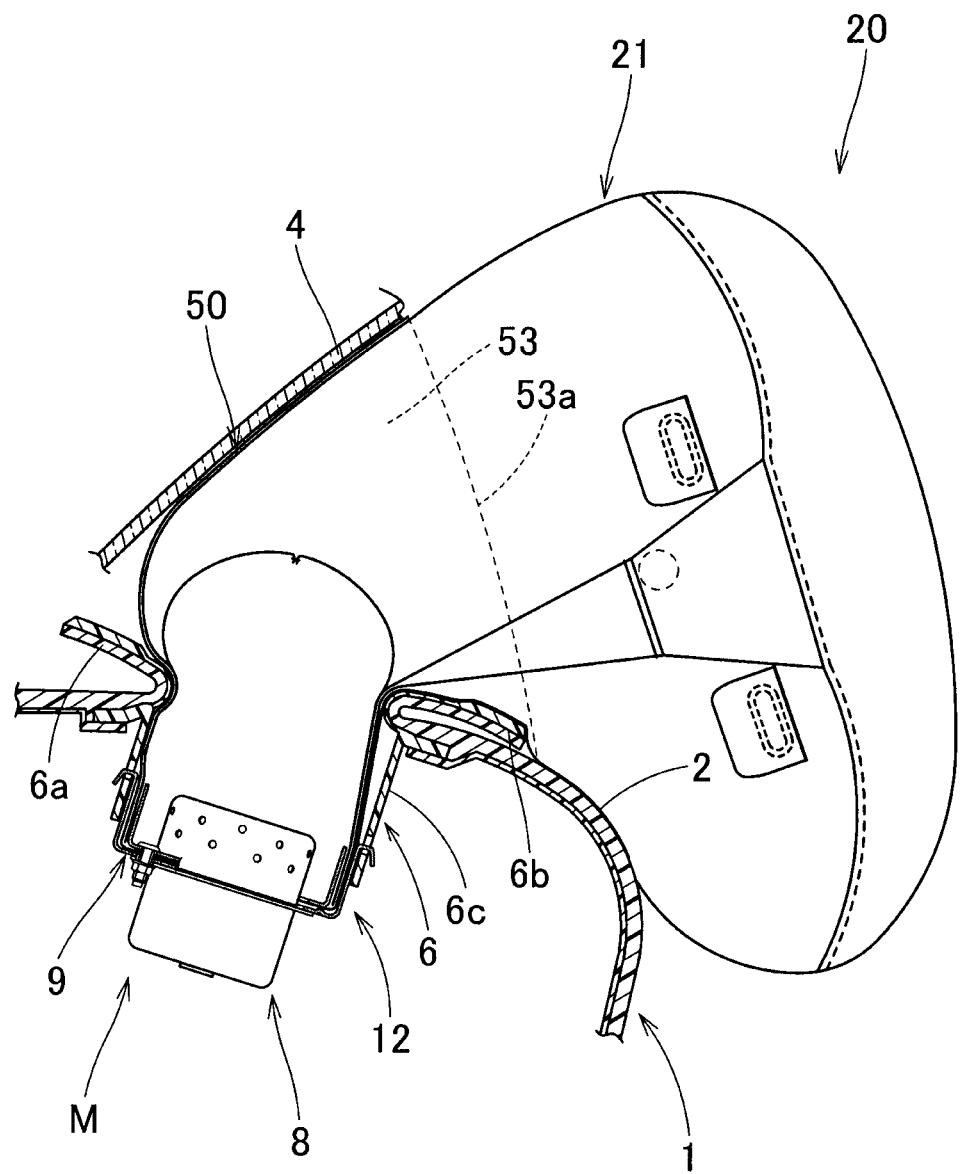
FIG. 7 is a schematic vertical sectional view of the airbag device of FIG. 1 as the airbag is fully deployed.
Figure 8:
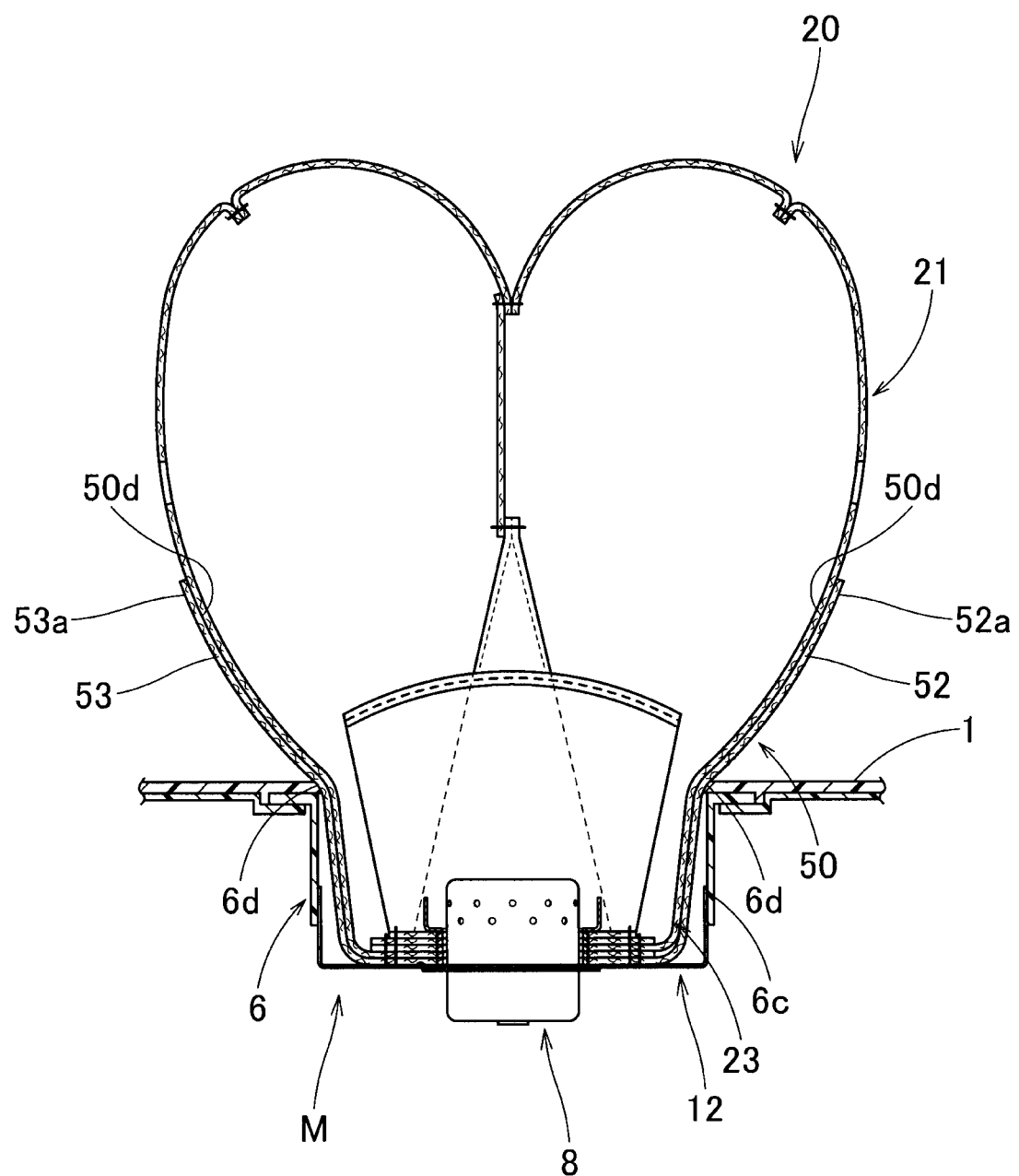
FIG. 8 is a schematic horizontal sectional view of the airbag device of FIG. 1 as the airbag is fully deployed.

An airbag 20 for a passenger seat embodying the invention is used in an airbag device M for a passenger seat as shown in in FIGS. 1, 7 and 8. The airbag device M is a top-mount airbag device stored inside a top surface 2 of an instrument panel or dashboard 1. Unless otherwise specified, a front and rear direction, an up and down direction and a left and right direction in the following description are intended to refer to a front and rear direction, an up and down direction and a left and right direction of a vehicle V.

As shown in FIGS. 1, 7 and 8, the airbag device M includes an airbag 20, which is folded up, an inflator 8 for feeding the airbag 20 with an inflation gas, a case or storage 12 for housing and holding the airbag 20 and inflator 8, a retainer 9 for attaching the airbag 20 and inflator 8 to the case 12, and an airbag cover 6 for covering the airbag 20.

The airbag cover 6 of the illustrated embodiment is integral with the dashboard 1 which is made from synthetic resin, and includes two doors, i.e., front and rear doors 6a and 6b which are openable when pushed by the airbag 20 upon airbag deployment. The airbag cover 6 further includes, around the doors 6a and 6b, a joint wall 6c which is coupled with the case 12. In the illustrated embodiment, the storage is composed of an area surrounded by the case 12 and the joint wall 6c of the airbag cover 6.

As shown in FIG. 1, the inflator 8 includes a main body 8a that is formed into a generally pot-like shape and provided with a plurality of gas discharge ports 8b, and a flange 8c used for attachment to the case 12.

The case (as the storage) 12 is made of sheet metal into a generally parallelepiped with a generally rectangular opening at the top. As shown in FIGS. 1, 7 and 8, the case 12 includes a generally rectangular bottom wall 12a that is provided with an opening for receiving the inflator 8 from below and a circumferential wall 12b that extends upward from an outer circumferential edge of the bottom wall 12a and retains the joint wall 6c of the airbag cover 6. In the illustrated embodiment, the case 12 has a greater width in a left and right direction than in a front and rear direction, as shown in FIG. 8. The airbag 20 and inflator 8 are attached to the bottom wall 12a of the case 12 by locating the retainer 9 inside the airbag 20 such that the bolts 9a of the retainer 9 go through a periphery of a later-described gas inlet port 24 of the airbag 20, the bottom wall 12a of the case 12 and flange 8c of the inflator 8, and by fastening the bolts 9a with nuts 10. Further, not-shown brackets are provided on the bottom wall 12a of the case 12 for mounting on the vehicle body structure.

Figure 2:
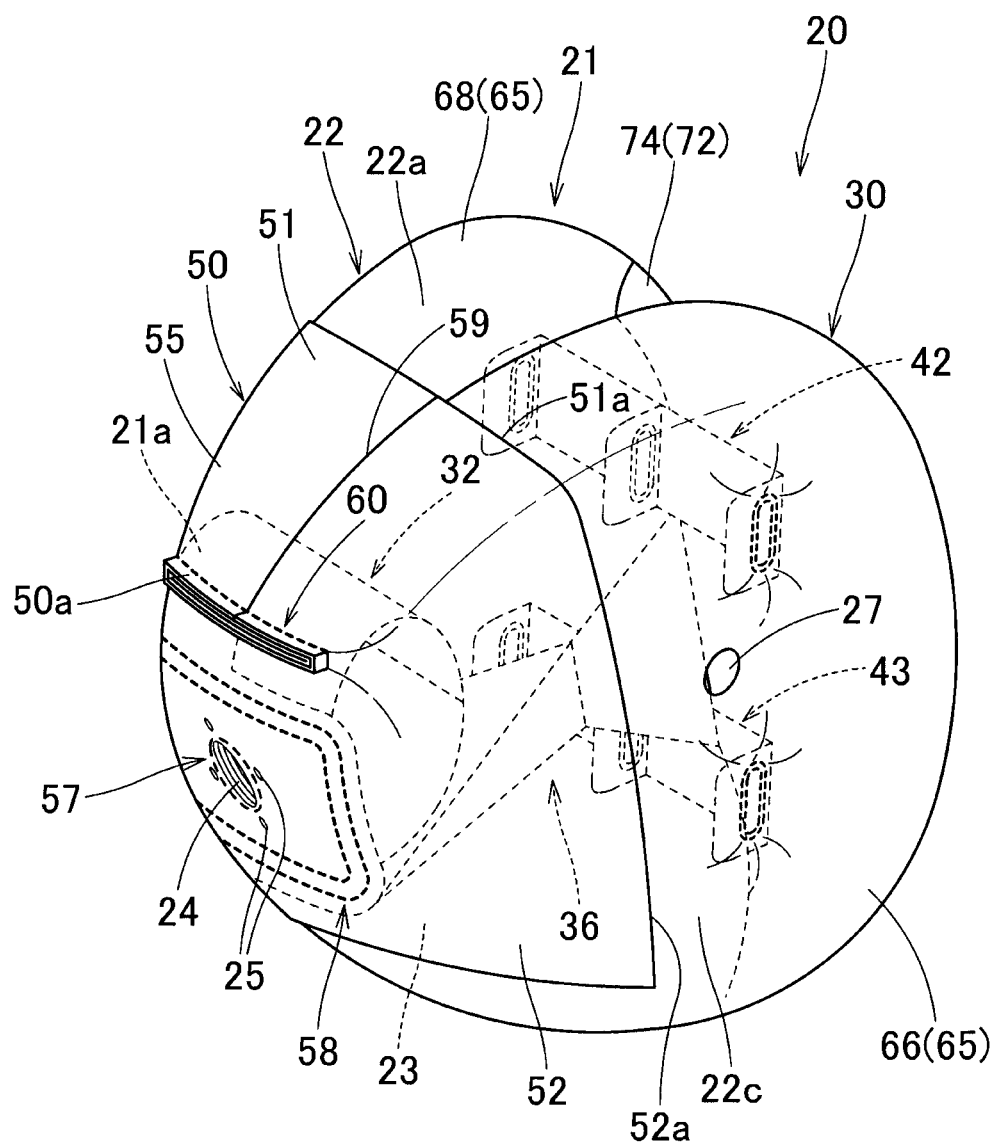
FIG. 2 is a perspective view of the airbag of the embodiment as inflated by itself.
Figure 3:
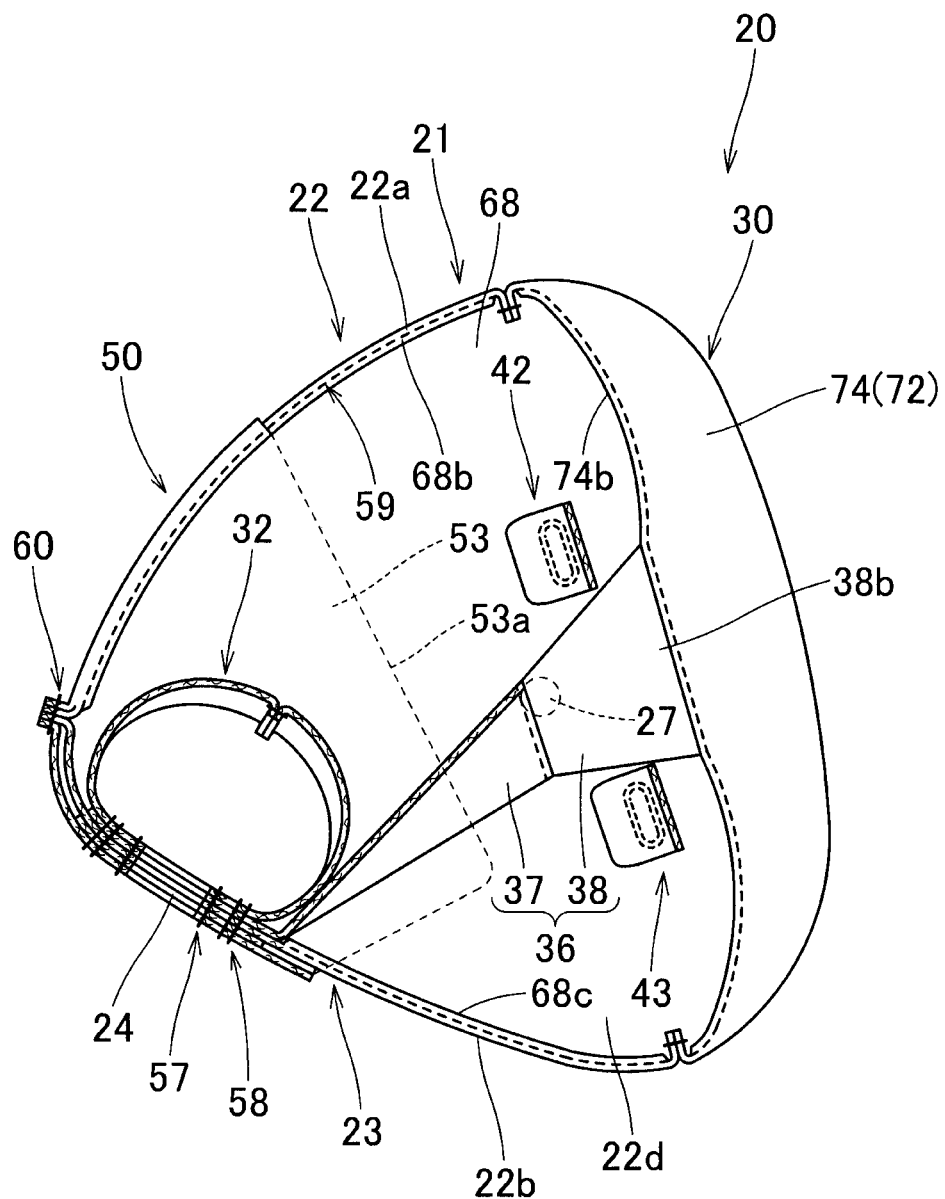
FIG. 3 is a schematic vertical sectional view of the airbag of FIG. 2 taken along a front and rear direction.
Figure 4:
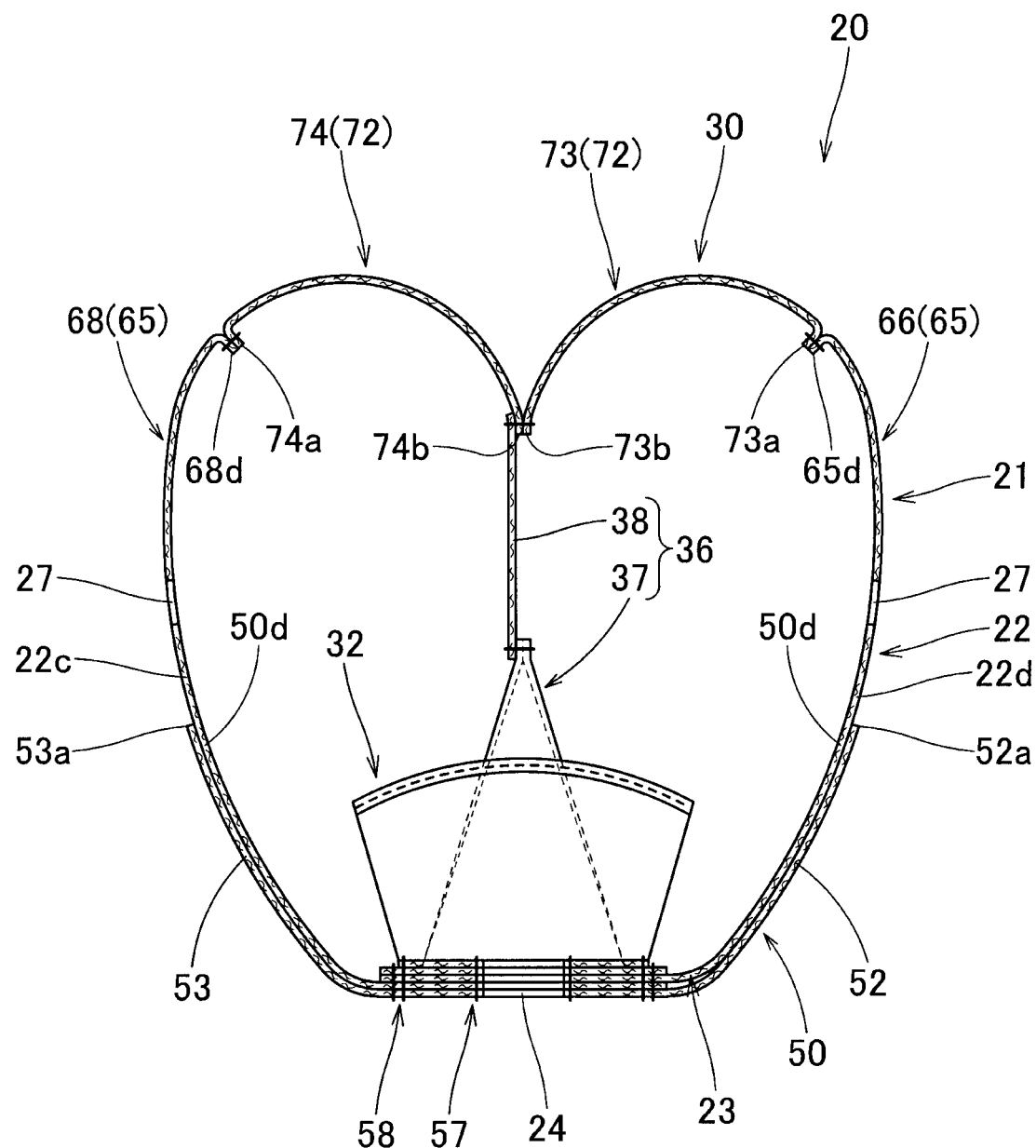
FIG. 4 is a schematic horizontal sectional view of the airbag of FIG. 2 taken along a front and rear direction.

Referring to FIGS. 2 to 4, the airbag 20 includes a bag body 21 which is inflatable with an inflation gas, and a cover panel 50 that covers an outer circumference of the bag body 21.

As shown in FIGS. 1 (with double-dotted lines) and 7, the bag body 21 is designed to be inflated and deployed in such a manner as to fill a space between the top plane 2 of the dashboard 1 and the windshield 4. More specifically, the bag body 21 is designed to be inflated into a generally square pyramid that narrows towards the front end, as shown in FIGS. 2 to 4, and includes a passenger-side wall 30 which is deployable towards the passenger seat for cushioning the passenger and a circumferential wall 22 which extends forward from the passenger-side wall 30 in a narrowing fashion.

The circumferential wall 22 is mainly so deployable as to fill the space between the top plane 2 of the dashboard 1 and the windshield 4, and includes an upper wall region 22a and a lower wall region 22b which are arranged generally along the left and right direction on the upper side and lower side, and a left wall region 22c and a right wall region 22d which are arranged generally along the front and rear direction on the left and right sides. A generally round gas inlet port 24 is formed proximate the front end of and at a generally center in the left and right direction of the lower wall region 22b for admitting an inflation gas. A plurality of (four, in the illustrated embodiment) mounting holes 25 are formed in the periphery of the inlet port 24 for receiving the bolts 9a of the retainer 9, by which the periphery of the inlet port 24 is mounted on the bottom wall 12a of the case 12. In the illustrated embodiment, a front end portion of the circumferential wall 22, i.e. a front end 21a portion of the bag body 21, which includes the inlet port 24 and its periphery provided with the mounting holes 25, constitutes a mount-side portion 23 of the bag body 21 on the case 12. The left wall region 22c and right wall region 22d are each provided with a generally round vent hole 27 for releasing an extra inflation gas.

The passenger-side wall 30 is designed to be deployed generally vertically at the rear end of the bag body 21 in such a manner as to face the front-seat passenger. In the illustrated embodiment, the passenger-side wall 30 as the bag body 21 is inflated is provided with a recessed region (reference numeral omitted) that is slightly sunken forward and extends generally vertically generally at the center in the left and right direction, as shown in FIGS. 3 and 4.

In the illustrated embodiment, the bag body 21 internally includes a redirecting cloth 32 for controlling the flow direction of an inflation gas, and a front-rear tether 36 and two left-right tethers 42 and 43 for controlling the contour of the bag body 21 as inflated.

The redirecting cloth 32 is disposed over the inlet port 24 and formed into a generally tubular contour open at the left and right ends for redirecting the inflation gas as has flown into the bag body 21 via the inlet port 24 towards the left and right. The redirecting cloth 32 is composed of a cloth member 34 depicted in FIG. 5.

The front-rear tether 36 connects a generally center in the left and right direction of the passenger-side wall 30 and the front end 21a portion of the bag body 21. In the illustrated embodiment, the front-rear tether 36 is formed by jointing a front section 37 which extends from the periphery of the gas inlet port 24 and a rear section 38 which extends from the passenger-side wall 30, as shown in FIGS. 3 and 4. The front section 37 is formed by folding a band-shaped front component 40 depicted in FIG. 5. As shown in FIGS. 2, 3 and 4, at airbag deployment, the front section 37 is formed into such a three-dimensional, bilaterally symmetric contour approximate to a generally triangular pyramid that the front end region extends generally along the left and right direction and the rear end region is disposed generally along the up and down direction. The rear section 38 has such a trapezoidal contour that narrows towards the front end 38a which is joined to the front section 37. In the illustrated embodiment, the rear end 38b of the rear section 38 is sewn to inner edges 73b and 74b of left section 73 and right section 74 of a later-described passenger-side panel 72, such that the rear section 38 is connected to a generally central position in the up and down direction of the passenger-side wall 30. The front-rear tether 36 makes a generally central portion in the left and right direction of the passenger-side wall 30 recessed forward at airbag deployment.

As shown in FIG. 3, the left-right tethers 42 and 43 of the illustrated embodiment are disposed above and below the front-rear tether 36 at airbag deployment. Each of the left-right tethers 42 and 43 connects rear end portions of the left wall region 22c and right wall region 22d of the bag body 21, thus are arranged along the left and right direction at airbag deployment. Each of the left-right tethers 42 and 43 is composed of a pair of band-shaped base cloths 45L and 45R/46L and 46R depicted in FIG. 5. The left-right tethers 42 and 43 limit a width in the left and right direction of the airbag 20 as inflated, in other words, a distance between the left wall region 22c and right wall region 22d.

Figure 6:
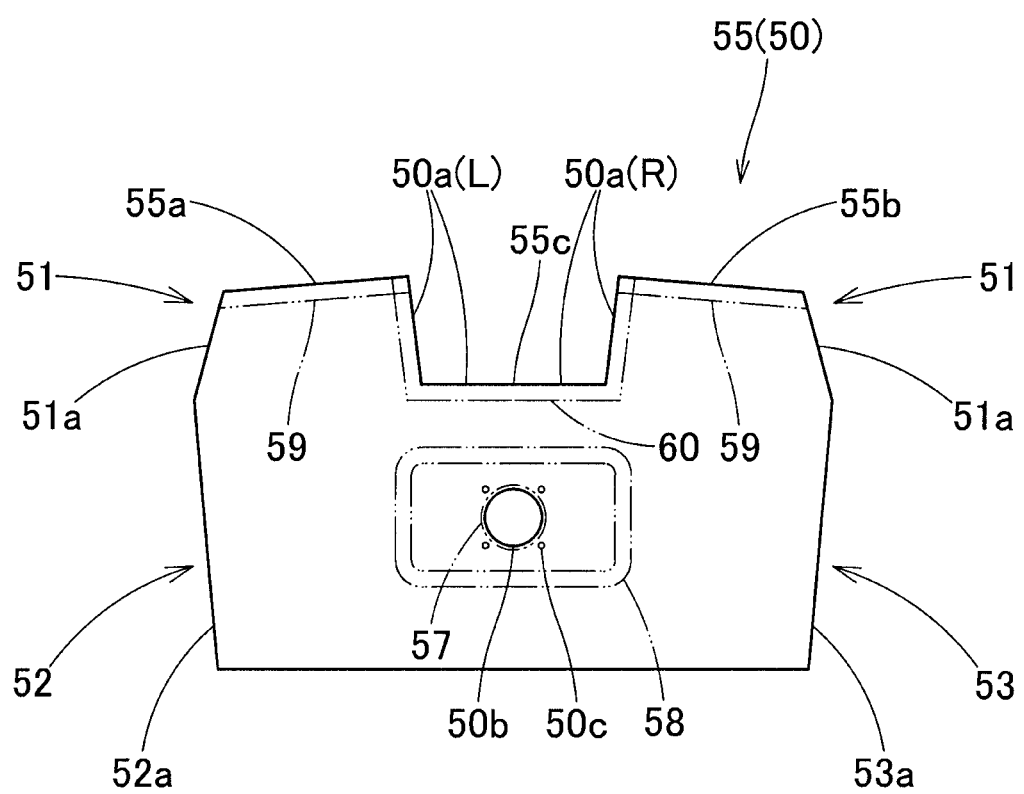
FIG. 6 is a plan view of a base cloth of a cover panel for use in the airbag of FIG. 2.

The cover panel 51 is made of a flexible sheet-shaped material, and covers an outer circumference of the mount-side portion 23 of the airbag 20 which is mounted on the case 12, as shown in FIGS. 2 to 4. More particularly, the cover panel 50 is made from a fabric woven with polyester yarn, polyamide yarn or the like, similarly to the bag body 21 as described later, and entirely covers the front end 21a portion of the bag body 21 as inflated including the periphery of the inlet port 24. More specifically, the cover panel 51 is provided with openings 50b and 50c which correspond to the inlet port 24 and mounting holes 25 of the bag body 21, and joined (sewn) to the bag body 21 with seams 57, 58, 59 and 60 by the front edge 50a portion, a central portion in the left and right direction of the upper surface, and the periphery of the inlet port 24 in the lower surface. Referring to FIG. 6, the cover panel 50 includes an upper portion 51 for covering an upper surface of the bag body 21, a left portion 52 for covering a left surface of the bag body 21, and a right portion 53 for covering a right surface of the bag body 21. The upper portion 51, left portion 52 and right portion 53 are configured such that the edges (rear edges as the airbag 20 is deployed) 51a, 52a and 53a are disposed at positions slightly to the front of the center in the front and rear direction of the upper wall 22a, left wall 22c and right wall 22d of the bag body 21 as inflated, as shown in FIGS. 2 to 4. Further, the upper portion 51, left portion 52 and right portion 53 are configured such that the edges 51a, 52a and 53a form a generally straight continuous line, as shown in FIGS. 2 and 3. As described above, the cover panel 50 is joined (sewn) to the bag body 21 by the front edge 50a portion, the central portion in the left and right direction of the upper surface (i.e. a central portion in the left and right direction of the upper portion 51), and the periphery of the inlet port 24 in the lower surface. In other words, the edges 52a and 53a of the left portion 52 and right portion 53 and portions of the edge 51a of the upper portion 51 apart from the later-described seam 59 in the left and right direction are not joined to the bag body 21, such that an inner surface 50d of the cover panel 50 in vicinities of the edges 51a, 52a and 53a is capable of slipping relative to the bag body 21. In the illustrated embodiment, the cover panel 50 is designed such that the edges 51a, 52a and 53a of the upper portion 51, left portion 52 and right portion 53 are disposed above the dashboard 1 at airbag deployment such that the upper portion 51, left portion 52 and right portion 53 cover an inner surface of an edge 6d of the airbag cover 6 which emerged due to opening of the doors 6a and 6b, as shown in FIGS. 7 and 8. That is, at deployment of the bag body 21, the cover panel 50 covers an edge of the dashboard (as an interior trim member) 1 (i.e. an upper end portion of the joint wall 6c, that is, the edge 6d of the airbag cover 6 which emerged due to opening of the doors 6a and 6b) at three sides of the storage (i.e. the case 12 and joint wall 6c of the airbag cover 6) except the rear side, i.e. at the front, left and right sides of the case 12.

In the illustrated embodiment, the cover panel 50 is composed of a single base cloth (i.e. base member) 55 which has a generally rectangular contour elongated in the left and right direction, as shown in FIG. 6. The base cloth 55 has a bilaterally symmetrical contour and is provided with openings 50b and 50c which correspond to the inlet port 24 and mounting holes 25, in a vicinity of the center in the left and right direction. In the illustrated embodiment, the cover panel 50 is joined to the bag body 21 by the front edge 50a and the center in the left and right direction of the upper portion 51 at the same time that base cloths of the bag body 21 (specifically, a left panel 66 and a right panel 68, as described later) are sewn together by the seams 59 and 60. More particularly, referring to FIG. 6, a left portion 50a (L) and a right portion 50a (R) of the front edge 50a region of the base cloth 55 are each doubled and sewn up with the seam 60. In the illustrated embodiment, the cover panel 50 is further joined to the bag body 21 at a circumference of the opening 50b, i.e. at a circumference of the inlet port 24, with the seams 57 and 58, as shown in FIGS. 2 and 6 (with double-dotted lines).

Figure 5:
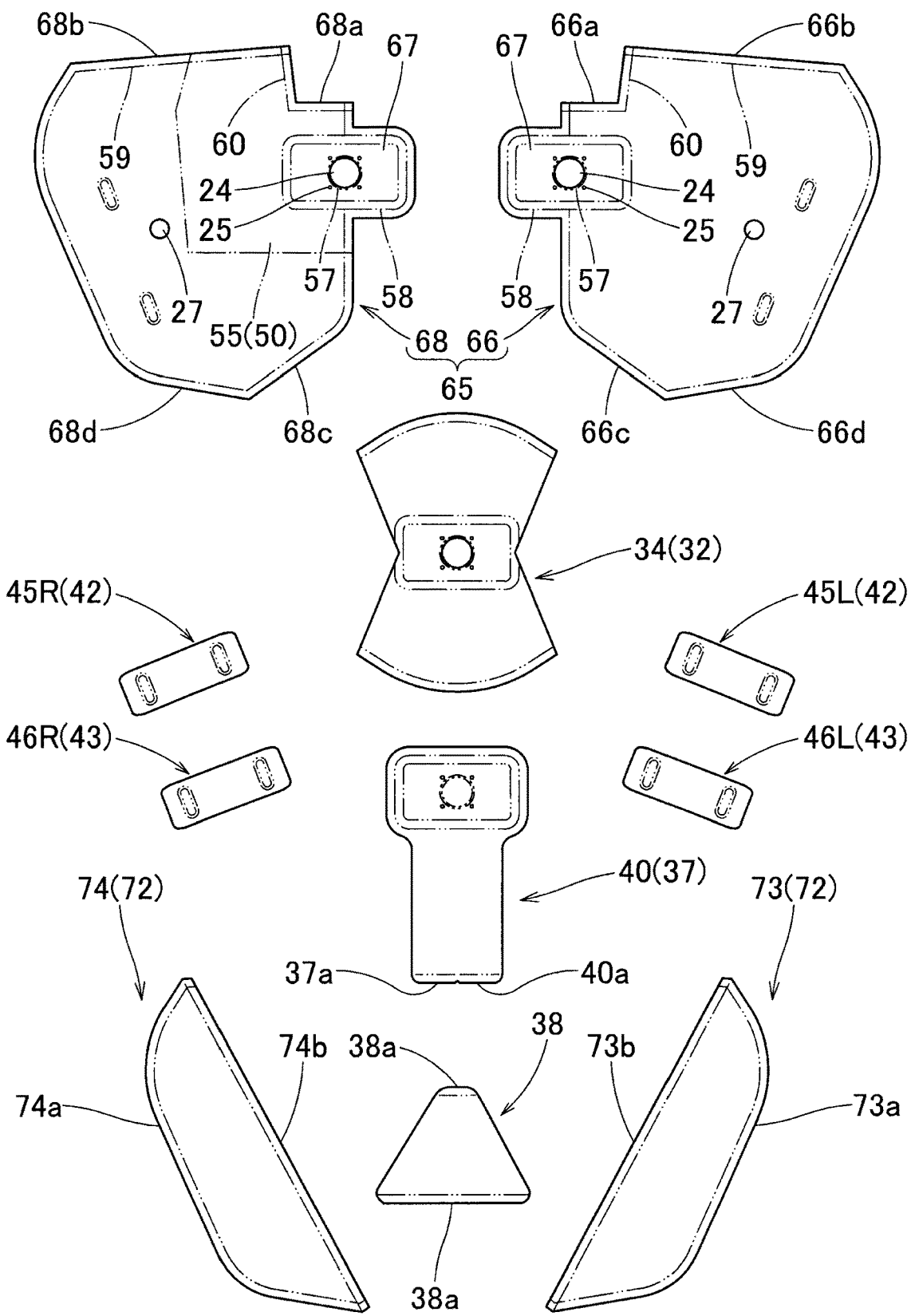
FIG. 5 depicts base members of the airbag of FIG. 2 by plan views.

The bag body 21 is formed by sewing together circumferential edges of predetermined shaped base cloths (i.e. base members). As shown in FIG. 5, the bag body 21 of the illustrated embodiment includes a circumferential panel component 65 which mainly forms the circumferential wall 22, and a passenger-side panel 72 which mainly forms the passenger-side wall 30. The circumferential panel component 65 includes a left panel 66 and a right panel 68 which respectively forms a left portion and a right portion of the circumferential wall 22. The left panel 66 forms a left half portion of the upper wall 22a, the left wall 22c, and a left half portion of the lower wall 22b, and the right panel 68 forms a right half portion of the upper wall 22a, the right wall 22d, and a right half portion of the lower wall 22b, in the circumferential wall 22. The left panel 66 and right panel 68 are each provided with a protruding region 67/69 for forming the periphery of the gas inlet port 24. The passenger-side panel 72 includes a left section 73 and a right section 74 which respectively forms a left portion and a right portion of the passenger-side wall 30.

In the illustrated embodiment, the components of the bag body 21, i.e. the left panel 66, right panel 68, passenger-side panel 72, cloth member 34 for forming the redirecting cloth 32, front component 40 and rear section 38 for forming the front-rear tether 36, and base cloths 45L, 45R, 46L and 46R for forming the left-right tethers 42 and 43, are formed of a flexible woven fabric of polyester yarn, polyamide yarn or the like.

Production of the airbag 20 is now described. As preparatory works, the inner edges 73b and 74b of the left section 73 and right section 74 of the passenger-side panel 72 are sewn together with the rear edge 38b of the rear section 38 of the front-rear tether 36 sandwiched there between. The base cloths 45L, 45R, 46L and 46R of the left-right tethers 42 and 43 are each sewn to an inner surface of a corresponding component, the left panel 66 or right panel 68. Then the left panel 66 and right panel 68 are mated and sewn together by the lower edges 66c and 68c. Then the left panel 66 and right panel 68 are opened such that the upper edges 66b and 68b are separated from each other, and the protruding regions 67 and 69 are laid one above the other. The base cloth 55 for forming the cover panel 50 is placed on the outer surface of the protruding regions 67 and 69, and the front component 40 of the front-rear tether 36 and the cloth member 34 of the redirecting cloth 32 are placed on the inner surface of the protruding regions 67 and 69. Then the protruding regions 67 and 69, the base cloth 55, the front component 40, and the cloth member 34 are sewn together at a circumference of a portion to be the inlet port 24 with sewing threads, thereby forming the seams 57 and 58. Then the inlet port 24 and mounting holes 25 are punched out. Thereafter, the upper edges 66b and 68b of the left panel 66 and right panel 68 and a left front edge 55a and right front edge 55b of the cover-panel base cloth 55 are sewn together with sewing threads, thereby forming the seam 59. Subsequently, the rear edge 66d of the left panel 66 is sewn to an outer edge 73a of the left section 73 of the passenger-side panel 72, while the rear edge 68d of the right panel 68 is sewn to an outer edge 74a of the right section 74. Then, ends of corresponding base cloths 45L, 45R, 46L and 46R are sewn together to form the left-right tethers 42 and 43, and the rear end 40a of the front component 40 is sewn to the front end 38a of the rear section 38 to form the front-rear tether 36. Opposite edges of the cloth member 34 are sewn together to form the redirecting cloth 32. Thereafter, the bag body 21 is reversed inside out from an unsewn region at the front upper edges 66a and 68a of the left panel 66 and right panel 68. Then each of the front upper edge 66a of the left panel 66 and front upper edge 68a of the right panel 68 is doubled and sewn up together with an inner front edge 55c of the cover-panel base cloth 55, thereby forming the seam 60. Thus the bag body 21 is completed as well as the cover panel 50 is joined to the bag body 21. Thus the airbag 20 is finished.

Mounting of the airbag device M on the vehicle is now described. Firstly, the retainer 9 is housed inside the airbag 20, and the airbag 20 is folded up so as to fit in the case 12. The airbag 20 as folded is then wrapped up by a tearable wrapping sheet (not shown) for keeping the folded-up configuration. Then the airbag 20 is placed on the bottom wall 12a of the case 12 such that the bolts 9a of the retainer 9 protrude downwardly from the bottom wall 12a, and the main body 8a of the inflator 8 is set in the case 12 from below the opening of the bottom wall 12a such that the bolts 9a projecting downwardly from the bottom wall 12a penetrate the flange 8c of the inflator 8. If then the bolts 9a projecting from the flange 8c of the inflator 8 are fastened with the nuts 10, the airbag 20 and the inflator 8 are mounted on the case 12.

Thereafter, the circumferential wall 12b of the case 12 is attached to the joint wall 6c of the airbag cover 6 which has been incorporated in the dashboard 1, and the not-shown brackets of the case 12 are secured to the vehicle body structure. If then the inflator 8 is electrically connected to a not-shown control device, the airbag device M is mounted on the vehicle.

After the airbag device M was mounted on the vehicle, if the inflator 8 discharges an inflation gas from the gas discharge ports 8b, the airbag 20 is inflated with the inflation gas, and pushes and opens the doors 6a and 6b of the airbag cover 6. Then the airbag 20 exits the case 12 via an opening formed by opening of the doors 6a and 6b while unfolding, and is deployed upward and rearward in such a manner as to fill the space between the top plane 2 of the dashboard 1 and the windshield 4, as shown in FIGS. 1 (with double-dotted lines), 7 and 8.

With the airbag 20 of the illustrated embodiment, at airbag deployment, the cover panel 50 covers the edge of the dashboard 1 (i.e. the interior trim member) at least in the left and right sides of the storage (more particularly, the edge 6d of the airbag cover 6 which emerged due to opening of the doors 6a and 6b in the left and right sides of the case 12, in the illustrated embodiment), and therefore, the cover panel 50 adequately protects the bag body 21 from being interfered with the edge 6d in the course of airbag deployment. More particularly, as shown in FIG. 7, the cover panel 50 of the illustrated embodiment covers not only the left and right regions of the storage (case 12) but also the front region of the storage. Moreover, the cover panel 50 is configured such that the inner surface 50d in the vicinities of the edges 51a, 52a and 53a is capable of slipping or moving relative to the bag body 21. With this configuration, even if the cover panel 50 is brought into contact with the edge 6d of the airbag cover 6 or the like and gets stuck there at airbag deployment, the bag body 21 is able to slip out from the cover panel 50 and be deployed quickly with no influence of the jammed cover panel 50.

Therefore, the airbag 20 of the illustrated embodiment is able to protect the bag body 21 from the peripheral member of the storage and deploy the bag body 21 quickly at deployment.

Figure 9:
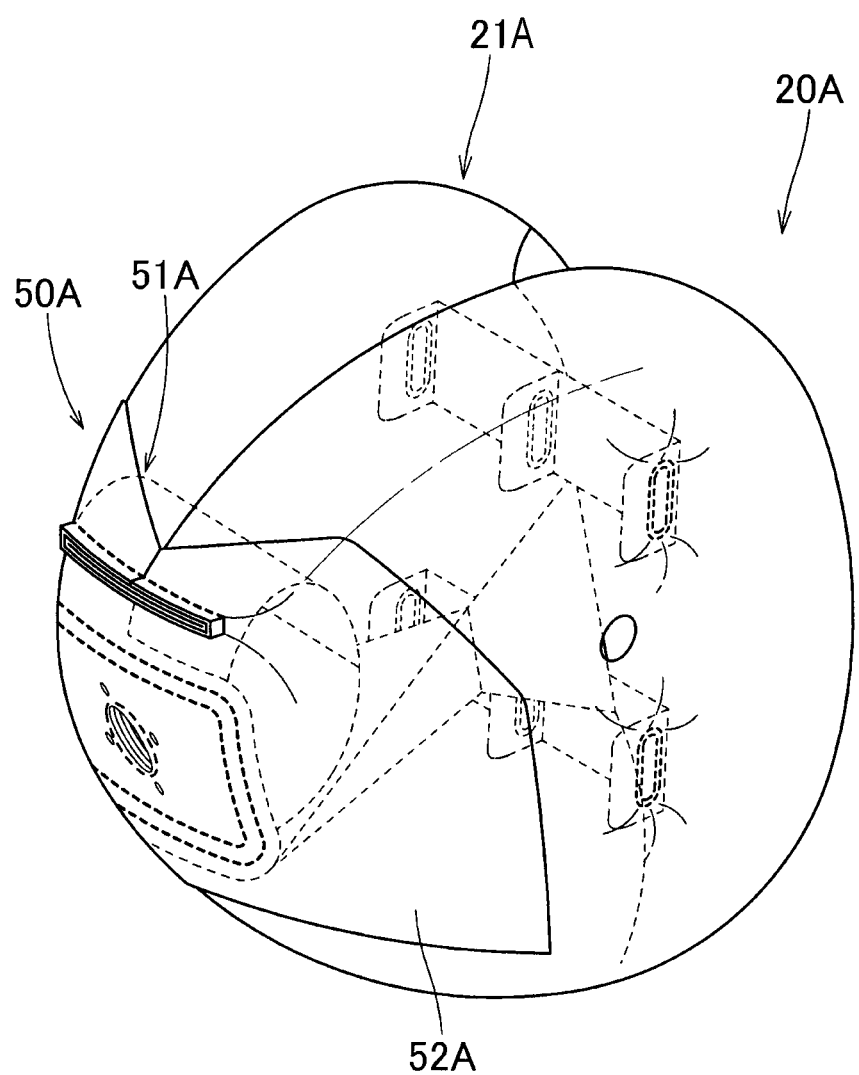
FIG. 9 is a perspective view of an airbag according to an alternative embodiment of the invention as inflated by itself.
Figure 10:
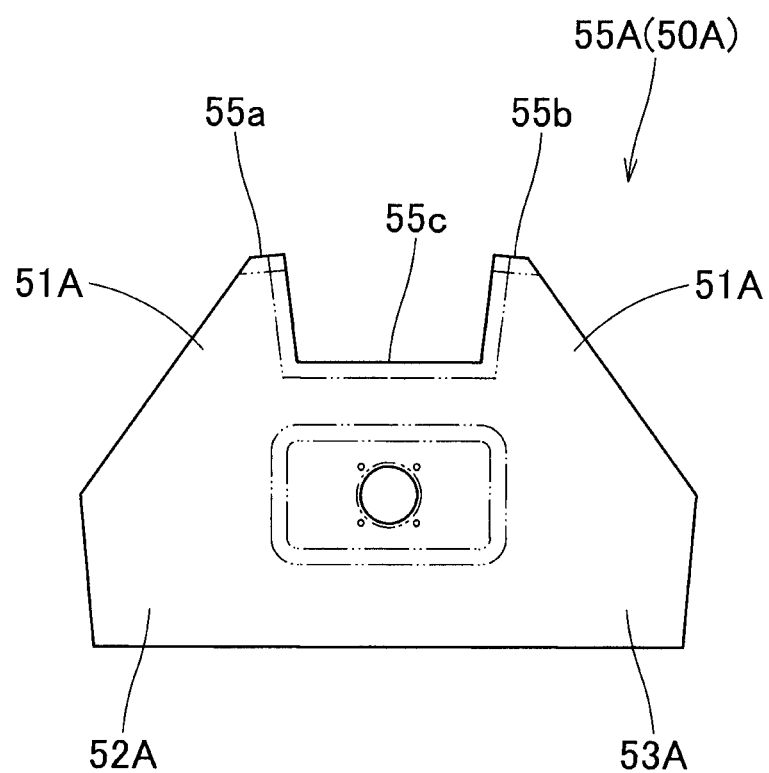
FIG. 10 is a plan view of a base cloth of a cover panel for use in the airbag of FIG. 9.

In the airbag 20 of the illustrated embodiment, the cover panel 50 covers an entire outer circumference of the front end 21a portion of the bag body 21 as inflated, and is joined to the bag body 21 by the central portion in the left and right direction of the upper surface, with the seam 59. This configuration will prevent the cover panel 50 from slipping considerably relative to the bag body 21 during a folding work of the airbag 20, thus facilitate the folding work. If such an advantageous effect does not have to be considered, the cover panel 50 may be joined to the bag body 21 at a different position(s). Although the cover panel 50 of the illustrated embodiment covers the entire outer circumference of the front end 21a portion of the bag body 21, the cover panel does not necessarily have to cover a peripheral region of the inlet port, but may be disposed only over a left portion, an upper portion and a right portion of the front end portion (that is, the mount-side portion, in the illustrated embodiment) of the bag body. Further alternatively, the cover panel may be configured like a cover panel 50A depicted in FIGS. 9 and 10. Similarly to the cover panel 50, the cover panel 50A includes an upper portion 51A for covering an upper surface of a bag body 21A, a left portion 52A for covering a left surface of the bag body 21A, and a right portion 53A for covering a right surface of the bag body 21A, and is joined to the bag body 21A by the central portion in the left and right direction of the upper surface as the bag body 21A is inflated. However, the cover panel 50A is so shaped that a rear portion of the upper portion 51A and a rear upper portion of each of the left and right portions 52A and 53A are cut out, as compared with the contour of the cover panel 50. That is, the cover panel 50A has such a contour that its edge, which forms the rear edge as deployed, has a foremost portion in the central portion in the left and right direction of the upper portion 51A, and extends obliquely rearward towards the left portion 52A and right portion 53A from the foremost portion. The cover panel 50A is composed of a cover-panel base cloth 55A depicted in FIG. 10. The cover panel 50A also covers the edge 6d of the airbag cover 6 which emerged due to opening of the doors 6a and 6b with the left portion 52A and right portion 53A, and therefore, the cover panel 50A adequately protects the bag body 21A from being interfered with the edge 6d in the course of airbag deployment. Moreover, with the reduced area of the upper portion 51A, the airbag 20A as folded will be less bulky and save space when mounted on the vehicle.

In the airbag 20 of the illustrated embodiment, furthermore, the cover panel 50 is joined to the bag body 21 with the seam 59 that sews together the edges 66b and 68b of the left panel 66 and right panel 68 that form the bag body 21. With this configuration, the joint work of the cover panel 50 to the bag body 21 can be conducted at the same as production of the bag body 21, which will simplify the production process of the airbag 20. If such an advantageous effect does not have to be considered, the cover panel may be separately joined to the bag body after the production of the bag body.

Furthermore, in the airbag 20 of the illustrated embodiment, the cover panel 50 is composed of a single base cloth 55. This configuration will reduce the number of components of the airbag 20. If such an advantageous effect does not have to be considered, the cover panel may be composed of a plurality of base members.

What is claimed is:

1. An airbag for a passenger seat adapted to be folded and stored in a storage which is disposed in an interior trim member of a vehicle in front of a passenger seat, the airbag being deployable towards the passenger seat in such a manner as to enlarge towards the left and right when exiting the storage, the airbag comprising:
   a bag body that is inflatable with an inflation gas and includes a mount-side portion adapted to be mounted on the storage; and
   a cover panel that is made of a flexible sheet-shaped material and covers an outer circumference of the mount-side portion of the bag body, the cover panel being configured to cover an edge of the interior trim member at least in left and right sides of the storage at airbag deployment, the cover panel being joined to the bag body in such a manner that an edge portion of the cover panel is capable of slipping relative to the bag body at least in left and right portions,
   wherein
   the cover panel is folded together with the bag body when the airbag is folded so as to fit in the storage,
   the cover panel includes an upper portion for covering an upper surface of the bag body, a left portion for covering a left surface of the mount-side portion and a right portion for covering a right surface of the mount-side portion,
   a joint portion which joins the upper portion of the cover panel to the bag body is arranged along a front-rear direction on a central portion in a left and right direction of the upper portion, and
   a rear edge portion of the cover panel is not joined to the bag body.

2. The airbag for a passenger seat of claim 1, wherein:
   the cover panel is disposed over an entire outer circumference of a front end portion of the bag body as inflated including the mount-side portion.

3. The airbag for a passenger seat of claim 2, wherein the cover panel is joined to the bag body with a seam that sews edges of one or more sheet-shaped base members of the bag body together.

4. The airbag for a passenger seat of claim 3, wherein the cover panel is composed of a single base member.

5. The airbag for a passenger seat of claim 4, wherein:
   the upper portion, the left portion and the right portion of the cover panel are configured such that their edges each form a generally straight continuous line when the bag body is inflated.

6. The airbag for a passenger seat of claim 4, wherein:
   an edge of the cover panel has a foremost portion in a central portion in the left and right direction of the upper portion, and extends obliquely rearward towards the left portion and right portion from the foremost portion.

7. The airbag for a passenger seat of claim 2, wherein the cover panel is composed of a single base member.

8. The airbag for a passenger seat of claim 1, wherein the cover panel is joined to the bag body with a seam that sews edges of one or more sheet-shaped base members of the bag body together.

9. The airbag for a passenger seat of claim 8, wherein the cover panel is composed of a single base member.

10. The airbag for a passenger seat of claim 1, wherein the cover panel is composed of a single base member.

11. The airbag for a passenger seat of claim 1, further comprising
    a redirecting cloth for controlling a flow direction of the inflation gas, the redirecting cloth is formed into a generally tubular contour open at a left end and right end thereof for redirecting the inflation gas flowing into the bag body toward the left and the right.

* * * * *